United States Patent [19]
Otsuka et al.

[11] Patent Number: 4,852,882
[45] Date of Patent: Aug. 1, 1989

[54] DEVICE FOR GOLF PRACTICING

[75] Inventors: Kazuhiko Otsuka; Koji Nobiraki, both of Nara, Japan

[73] Assignee: Nitta Industries Corporation, Osaka, Japan

[21] Appl. No.: 209,326

[22] Filed: Jun. 20, 1988

[30] Foreign Application Priority Data

| Jul. 10, 1987 | [JP] | Japan | 62-172498 |
| Oct. 5, 1987 | [JP] | Japan | 62-251145 |
| Nov. 16, 1987 | [JP] | Japan | 62-289063 |
| Jan. 6, 1988 | [JP] | Japan | 63-998 |
| Jan. 6, 1988 | [JP] | Japan | 63-999 |

[51] Int. Cl.$^4$ .............................. A63B 69/36
[52] U.S. Cl. ..................... 273/183 B; 273/190 A; 2/199
[58] Field of Search ........... 273/183 B, 183 E, 183 R, 273/190 R, 190 A, 17; 351/155; 2/15, 10, 452, 209.1, 196, 185 R, 199

[56] References Cited

U.S. PATENT DOCUMENTS

| 1,980,101 | 11/1934 | Schneider | 273/190 A |
| 2,330,442 | 9/1943 | Nero | 273/183 B |
| 3,487,549 | 1/1970 | Engesser | 273/183 B |
| 4,531,743 | 7/1985 | Lott | 273/183 B |

FOREIGN PATENT DOCUMENTS 2125298 3/1984 United Kingdom ............ 273/183 B

Primary Examiner—George J. Marlo
Attorney, Agent, or Firm—Koda and Androlia

[57] ABSTRACT

A golf practicing device for use by a golfer by mounting it on his head when the golfer trains himself in hitting a golf ball with a golf club, which constantly permits accurate hitting of the ball and thus can serve for improvement of the golfer's golfing skill. The device comprises a body and a vision constricting element having at least two vision constricted view apertures, the golfer being allowed to look at the golf ball only through the vision constricted view apertures via the body. The body abuts a face area around the eyes, and since the sight of the golfer is disrupted at least at both sides, right and left, the golfer is obliged to hit while looking at the ball through the vision constricted view apertures. The view apertures can be adjusted with respect to their position and diameter according to the height, physical constitution, and inter-pupil distance of the golfer.

23 Claims, 18 Drawing Sheets

DEVICE FOR GOLF PRACTICING

BACKGROUND OF THE INVENTION

The present invention relates to a device for golf practicing and, more particularly, to a golf practicing device designed for use by a golfer by mounting it on his head when the golfer trains himself in hitting a golf ball with a golf club and which permits constantly accurate hitting of the ball in the practice of hitting, thus serving for the improvement of the golfer's hitting skill.

Hitherto, various kinds of devices have been known which are intended for use in golf practicing. However, these devices are merely of the type useful for measuring the meet position of the golf ball relative to the golf club and/or the force of drive given to the ball in attempts to enhance the straightforwardness and/or distance of shot travel, or for measuring the velocity of movement of the golf club at the head thereof when it is swung; and none of them are designed to permit accurate hitting of the golf ball. Therefore, these conventional devices are not very useful for improvement of the golfing skill.

SUMMARY OF THE INVENTION

In view of such state of the art, this invention is based on the idea that by narrowing the field of view of a golfer while in ball hitting practice so that only the ball is positively visible to the eyes of the golfer, it would be possible for the golfer to accurately hit the ball, which fact would prove to be effective for the improvement of his golfing skill.

Accordingly, it is a primary object of the invention to provide a device for golf practicing which constantly permits accurate ball hitting and which can prevent an early head rise at swing which leads the eyes away from the ball, or the so-called "head up".

Another object of the invention is to provide a device for golf practicing which, when worn, affords reasonable view of the foot position and other surrounding conditions and involves no danger due to it being worn.

Another object of the invention is to provide a device for golf practicing which permits visual follow-up of the direction of flight of the ball immediately after the ball is hit.

Another object of the invention is to provide a device for golf practicing which can be securely mounted on the head and which is free from the possibility of getting out of position through a shock due to swing.

A further object of the invention is to provide a device for golf practicing which is very simple and compact in construction and inexpensive to manufacture.

Other objects, features, and advantages of the invention will become apparent from the following description with reference to the accompanying drawings.

In order to accomplish these objects and other objects which will become apparent from the following description, the device for golf practicing in accordance with the invention comprises a body which is open at its front and rear sides and adapted to be held in position by bringing its rear open portion in abutment with the face of a wearer at a location around the eyes, a field of vision constricting element having at least two field-of-vision constricted view apertures and provided at the front open side of the body, and holding means for holding the device in position on the head of the wearer. Further, the device comprises view-aperture position adjuster means for adjusting the distance between the view apertures and their position relative to the field of vision constricting element, and view-aperture diameter adjuster means for diametrical adjustment of the view apertures. With the device mounted on his head, therefore, the wearer or golfer can hit a golf ball while looking at the ball through the interior of the body and of the field of vision constricting element, and then through the field-of-vision constricted view apertures. Through this arrangement, the view around the eyes of the golfer (at right and left sides in particular) is interrupted by the body and accordingly the golfer can swing always looking at the ball, accurate stroke being thus assured.

Aforesaid body may be of any shape insofar as it has right and left sides which can obstruct the wearer's rightward and leftward ranges of sight. The shape of the field of view constricting element is not particularly limited if the element is provided with at least two field-of-view constricted view apertures. The body may be, for example, of such rectangular tube shape that is open at both front and rear sides thereof. In another form, the body may be such that it is also open at the bottom side, or in a still another form, it is of such simple construction that it is also open at the top and bottom sides. The field of vision constricting element may be of various different configurations; for example, it may be of box shape and open at the rear side, or it may be of flat plate shape.

The field of vision constricting element may be so constructed that it is pivotable relative to the body about a shaft which is generally parallel to the front end of the body. Such arrangement provides an advantage that the golfer can visually ascertain the direction of flight of a ball by pivotally moving the field of vision constricting element upward or downward immediately after the ball is hit.

The holding means may be of a simple band form. If it is desired that the device should be firmly secured in position, however, the holding means may be of a cap form, such as helmet or the like.

The aperture diameter adjuster means for diametric adjustment of the field-of-vision constricted view apertures is preferably in the form of a multiple vane type aperture stop which can successively vary the diameter of the apertures and which is controllable for fine adjustment. Alternatively, however, it may be such that a plurality of apertures which are different in diameter are arranged in a movable plate so that one can be selected out of them.

The position adjuster means for the field-of-vision constricted view apertures may comprise at least two field-of-vision constricted view apertures provided individually in two shift plates which are movably and fixably mounted to the field of vision constricting element.

BRIEF DESCRIPTION OF THE DRAWINGS

FIG. 1 is a perspective view showing general arrangement of same;

FIG. 2 is an explanatory view in side elevation showing the device as it appears when worn.

FIG. 3 is a partial front view of a field of vision constricting element, in which there is shown position adjuster means for a field-of-vision constricted view aperture;

FIG. 4 is a front view showing a aperture stop as aperture diameter adjuster means for the field-of-vision constricted view aperture;

FIG. 5 is a side view of a golfer wearing the device for golf practicing in accordance with the invention as seen in ball hitting practice; and FIG. 6 is a front view thereof.

FIG. 7 is a perspective view of general arrangement; and FIG. 8 is an explanatory view in side elevation showing the device as it appears when worn.

FIG. 10 is an explanatory view in side elevation showing the device as it appears when worn.

FIG. 12 is an explanatory view in side elevation showing the device as it appears when worn.

FIG. 13 is a general perspective view; FIG. 14 is an explanatory view in side elevation showing the device as it appears when worn; FIG. 15 is a partial front view of the field of vision constricting element which shows means for adjusting the diameter and position of the field-of-vision constricted view aperture; and FIG. 16 is a partial sectional view taken along the line A—A in FIG. 15.

FIG. 17 is a perspective view of a sixth embodiment as seen from the rear side; FIG. 18 is a perspective view of a seventh embodiment as seen from the rear side; FIG. 19 is a perspective view of an eighth embodiment as seen from the rear side; and FIG. 20 is an explanatory view in side elevation showing such device as it appears when worn.

DETAILED DESCRIPTION OF THE INVENTION

Figure 1:
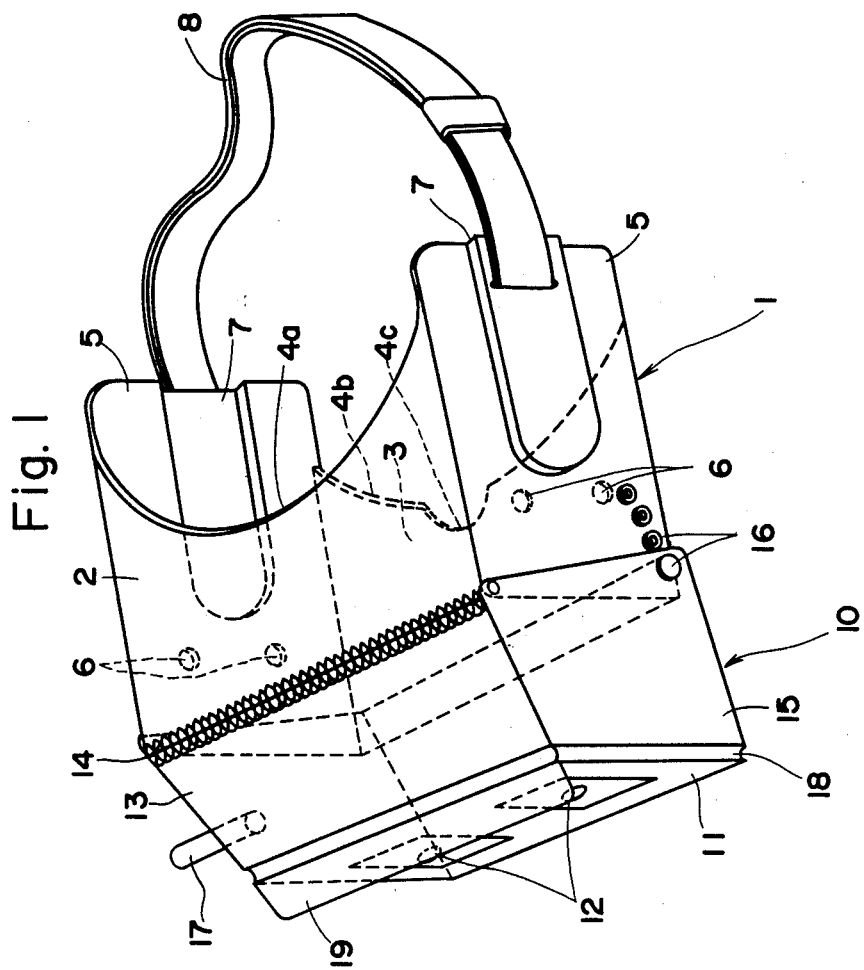
FIGS. 1 through 6, inclusive, illustrate a first embodiment of the device for golf practicing in accordance with the invention, in which a field of vision constricting element of box shape is pivotably mounted to a rectangular tube-shaped body at the front end of the latter.
Figure 2:
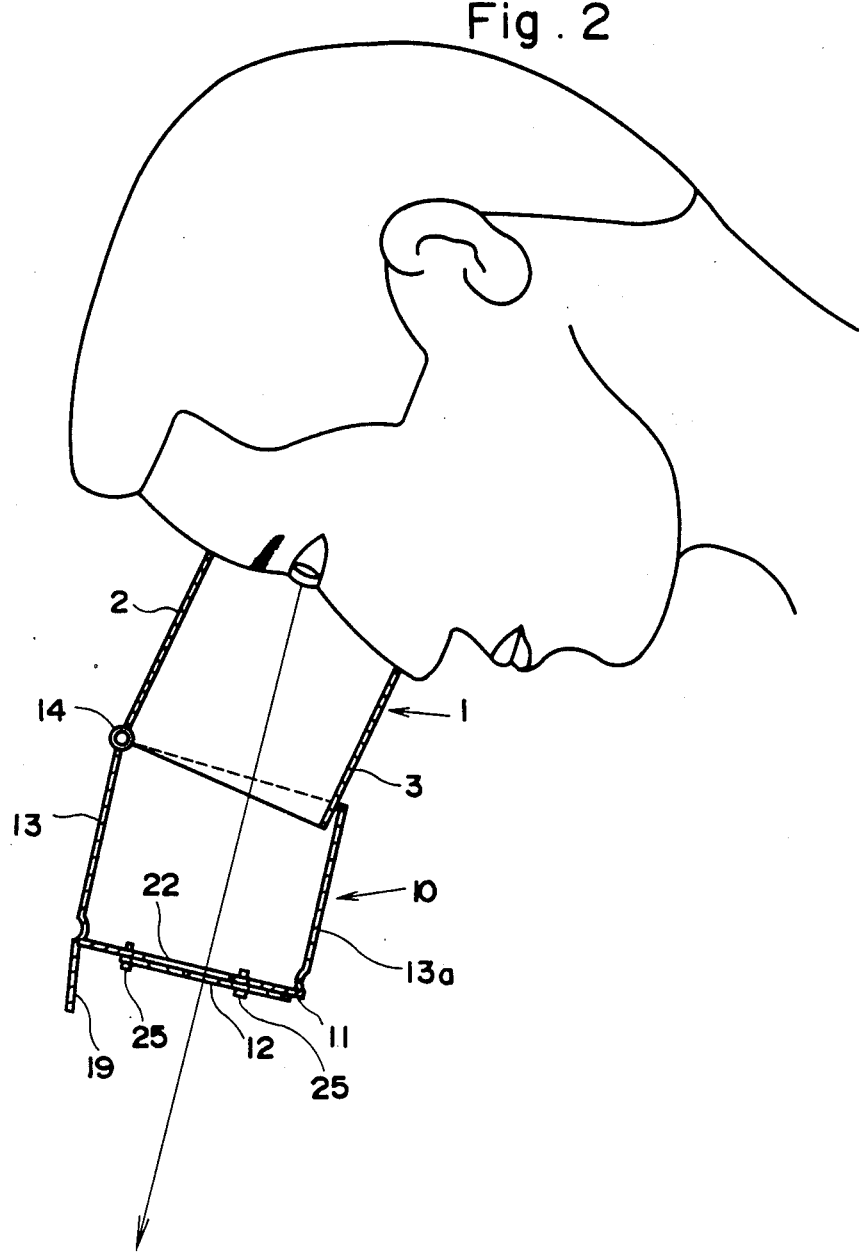

Preferred embodiments of the invention will now be described in detail with reference to the accompanying drawings.

FIGS. 1 through 6, inclusive, illustrate a first embodiment of the device for golf practicing in accordance with the invention. In this embodiment, a body 1 of the device is of rectangular tube shape such that it is open at the front and rear sides, and at the front open end of the body 1 there is pivotably mounted a box-shaped field of vision constricting element 10 having a sectional configuration generally comparable to the body 1 and which is open at the rear side only. Both the body 1 and the field of vision constricting element 10 may be formed of a synthetic or natural resin of comparatively rigid type or of a rigid rubber plate material. Preferably, however, they should be as light in weight as possible, since the device is mounted on the head of a person.

The rectangular tube shaped body 1 includes a top plate 2 and a bottom plate 3, said plates 2 and 3 having inwardly curved edge portions 4a and 4b respectively at the rear side which are respectively so designed as to abut the forehead and the cheek when the device is worn. The curved edge portion 4b of the bottom plate 3 is formed centrally with an arcuate notch 4c for receiving the nose. Two side plates 5 connecting the top and bottom plates 2, 3 have each a vent hole 6 and a recess groove 7 for preventing the side plates 5 from touching the rim of spectacles in case the wearer is spectacled. A holder band 8 is secured at both ends to the respective rear ends of those portions of the side plates 5 which are formed with the recess grooves 7.

The box-shaped field of vision constricting element 10 includes a front plate 11 having two field-of-vision constricted view apertures 12 provided therein, a top plate 13 pivotally connected at its rear edge portion by a pin or shaft to the front edge portion of the top plate 2 of the body 1, and a bottom plate 13a. At the joint of the top plates 2, 13 there is provided a spring 14 which urges the field of vision constricting element 10 in an upswing direction thereof. The upper plate 13, bottom plate 13a, and front, plate 11 are connected at sides by two side plates 15. The side plates 15 are in overlapping relation with the side plates 5 of the body 1. On one of the overlapping portions of the side plates 5 and 15 there is provided a tilt angle adjuster 16 for adjusting and fixing the tilt angle of the field of vision constricting element 10 relative to the body 1. This tilt angle adjuster 16 is of the hook type which comprises a plurality of hooks arranged in spaced apart relation on one of the side plates 5 of the body 1 and an eye provided on the corresponding side plate 15 of the field of vision constricting element 10 so that the hooks can be selectively brought into engagement with the eye in order to adjust and fix the tilt angle of the vision constricting element 10. The tilt angle adjuster 16 may be of any other suitable form, for example, one of the magnet catch type such that the hooks and eye are replaced by magnets, or of the velvet fastener type such that the hooks and eye are replaced by a velvet fastener.

In this embodiment, as above described, the field of vision constricting element 10 is pivotably fixed to the front end portion of the body 1, and further the tilt angle of the vision constricting element 10 is adjustable by means of the tilt angle adjuster 16. Therefore, the orientation of the view apertures 12 can be adjusted according to the height, form and physical features of the wearer. As such, the device can be advantageously used by a wide range of physical types of people. Another advantage is that it is unnecessary for the wearer to draw in his chin more than moderately when looking at the golf ball through the view apertures 12.

In the drawings, the reference numeral 17 is a handle for easy control of the view constricting element 10 which is provided on the side plate 15 opposite to the tilt angle adjuster 16; 18 is a waterway extending along the front edge of the top plate 13 and down to the front edge of the bottom plate 13a; and 19 is a collar mounted to the upper edge portion of the front plate 11.

Figure 3:
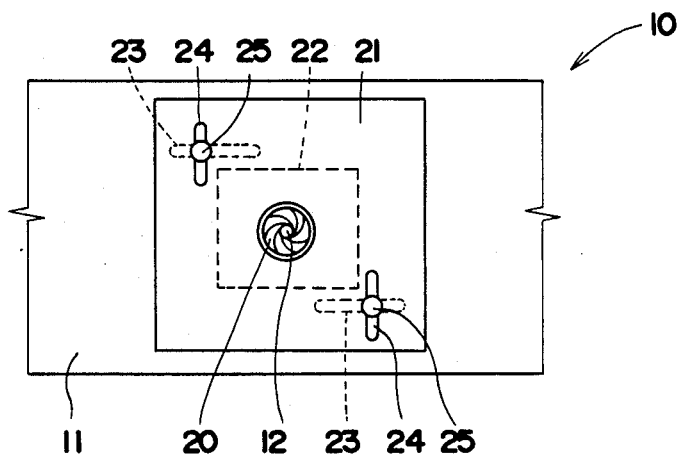
Figure 4:
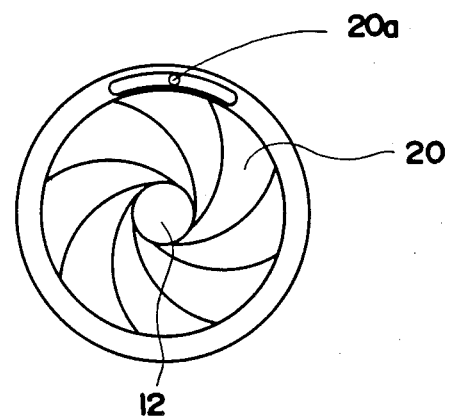

Generally it is preferred that the diameter of the view apertures 12 should be of such order (approximately 5 mm) as will permit visual recognition of the golf ball only when the device is worn. In order to allow adjustment of the diameter of the view apertures 12 suitably according to the visual power, golf skill, etc. of the wearer, however, there is provided an aperture diameter adjuster for each of the vision constricted view apertures 12. In this embodiment, as FIGS. 3 and 4 illustrate, a multiple vane type aperture stop 20 of same arrangement as is used in cameras or the like is employed as the aperture diameter adjuster, a center portion thereof serving as the view aperture 12. This aperture stop 20 is such that the diameter of the view aperture 12 can be increased or decreased by shifting a knob 20a. Thus, golf practicing may be carried out in such way that in the beginning stage the aperture stop 20 is tightened to narrow the field of vision so as to allow visual recognition of the golf ball only and that as improvement is achieved in golfing skill, the aperture stop 20 is gradually loosened to increase the aperture diameter, thereby to permit visual recognition of the ball and its surroundings. The aperture stop 20 makes it possible to successively change the aperture diameter and also to make fine visional adjustment. In this embodiment, it is also possible to use such means for adjustment as will be described hereinafter with respect to the fifth to eighth embodiments.

The distance between aforesaid two view apertures 12 and their position relative to the front plate 11 are variable by means of an aperture position adjusting assembly so that they can be adjusted according to the distance between pupils of eyes of the wearer, the distance between the golf ball and the eyes which varies according to the height of the wearer and etc. Thus, each of the view apertures 12 can be controlled to proper position by shifting it upward, downward, rightward, and/or leftward so that a virtual line connecting the golf ball and the wearer's eyes is straight. In this embodiment, as FIG. 3 shows, the aperture position adjusting assembly comprises a rectangular shift plate 21 with the aperture stop 20 mounted thereon, and a rectangular view aperture 22 formed in the front plate 11 of the field of view constricting element 10, said shift plate 21 being slidably superposed on the front side of the front plate 11 so that the center of the view aperture 12 goes in general agreement with the center of the rectangular view aperture 22. The rectangular view aperture 22 should be of such size that the view aperture 12 is not blocked by the front plate 11 when the shift plate 12 is moved within its movable range.

The shift plate 21 can be supported in place by any known means designed for the purpose if the shift plate 21, when moved in relation to the front plate 11, can be securely locked at any desired position. In the present embodiment, supporting for this purpose is effected in the following way. Laterally extending elongate holes 23 are provided adjacent two opposite corners of each of the rectangular view apertures 22 disposed in the front plate 11, and in the shift plate 21 there are formed, at locations corresponding to said laterally extending elongate holes 23, two vertically extending elongate holes 24 so that said elongate holes 24 individually intersect said elongate holes 23. A pin shaped locking member 25 is fixed at each of the intersecting points of the elongate holes 23, 24, whereby the shift plate 21 is slidably supported. The locking member 25 is a short-length pin having a head of a larger diameter than the width of the elongate holes 23, 24, said locking member 25 being fitted in the elongate holes 23, 24, a retainer piece of same shape as the head being fixed to the end of the locking member 25. Thus, the shift plate 21 is movable by application of finger force, but after so moved, it is prevented from free movement by the force of friction present between the shift plate 21 and the front plate 11. The shift plate 21 may be formed of same material as the body 1 or the field of vision constricting element 10. The respective lengths of the elongate holes 23, 24 are determined according to the movable range setting of the shift plate 21.

Figure 5:
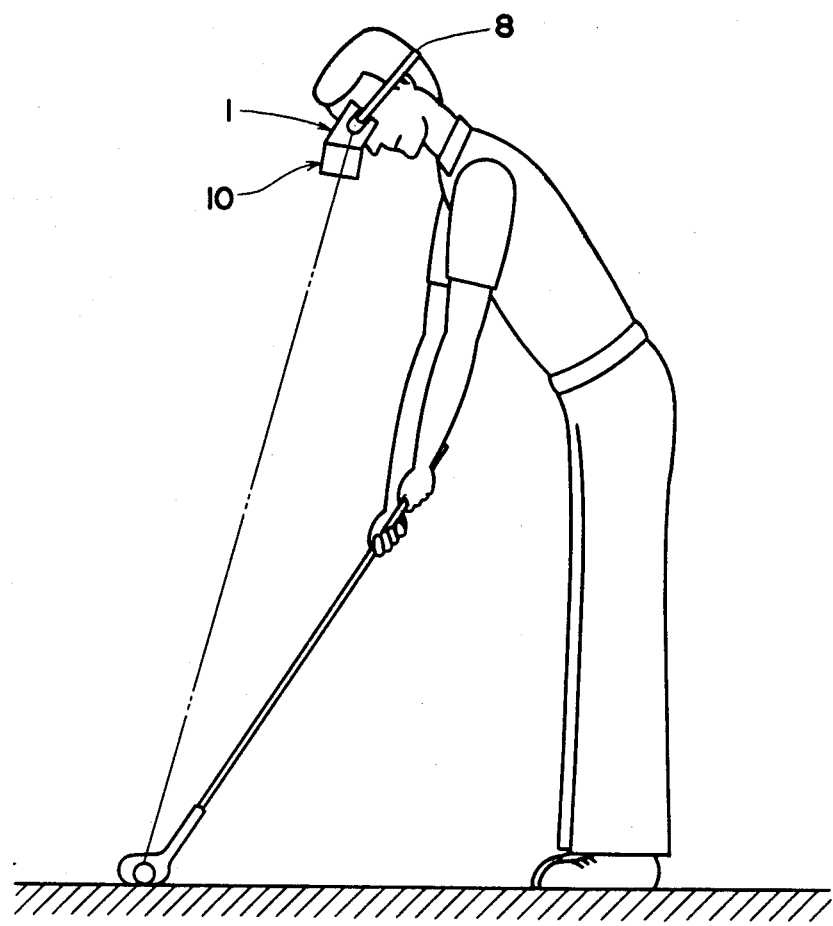
Figure 6:
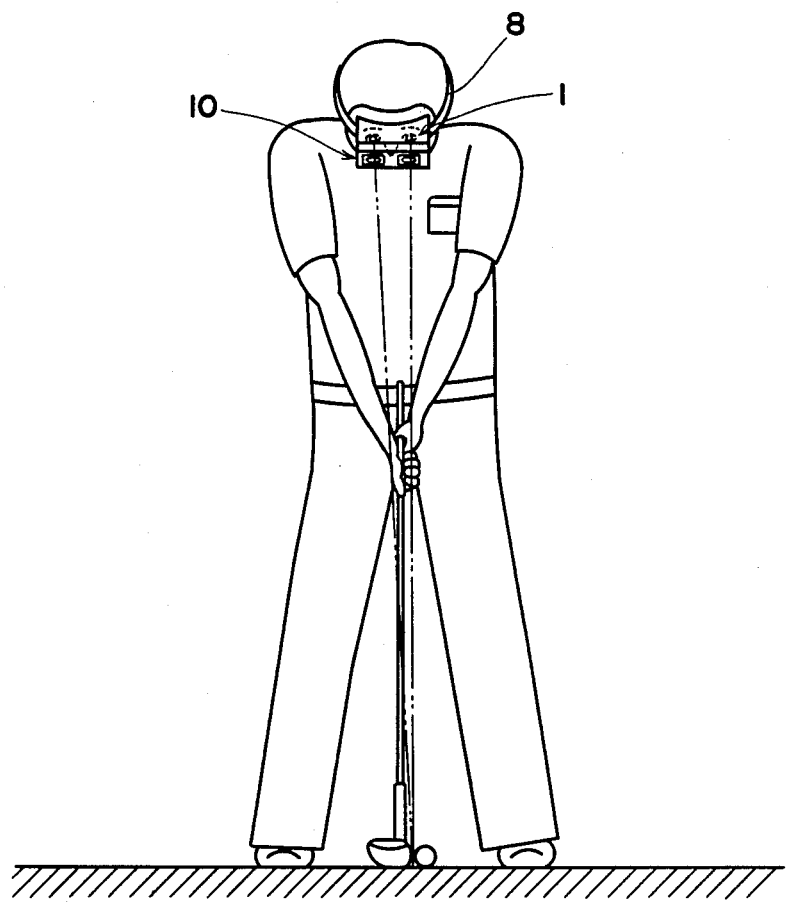

When using the golf practicing device of the above described arrangement, as FIGS. 5 and 6 illustrate, the practicing golfer wears the device in such way that the inwardly curved edge portions 4a, 4b of the body 1 are brought into abutment with the forehead and the cheek respectively, the device being held in position on the head by means of the holder band 8. By so doing the golfer can practice golf ball hitting in the usual way. When the device is worn, the field of vision is constricted and the body 1 of the device prevents the eyes from seeing the surroundings. Accordingly the golfer is forced to perform hitting practice while looking at the golf ball only or the golf ball and its surroundings only, which permits positive and accurate hitting and prevents the so-called "heat up". Surely, this will be very helpful for improvement of the golfing skill.

Figure 7:
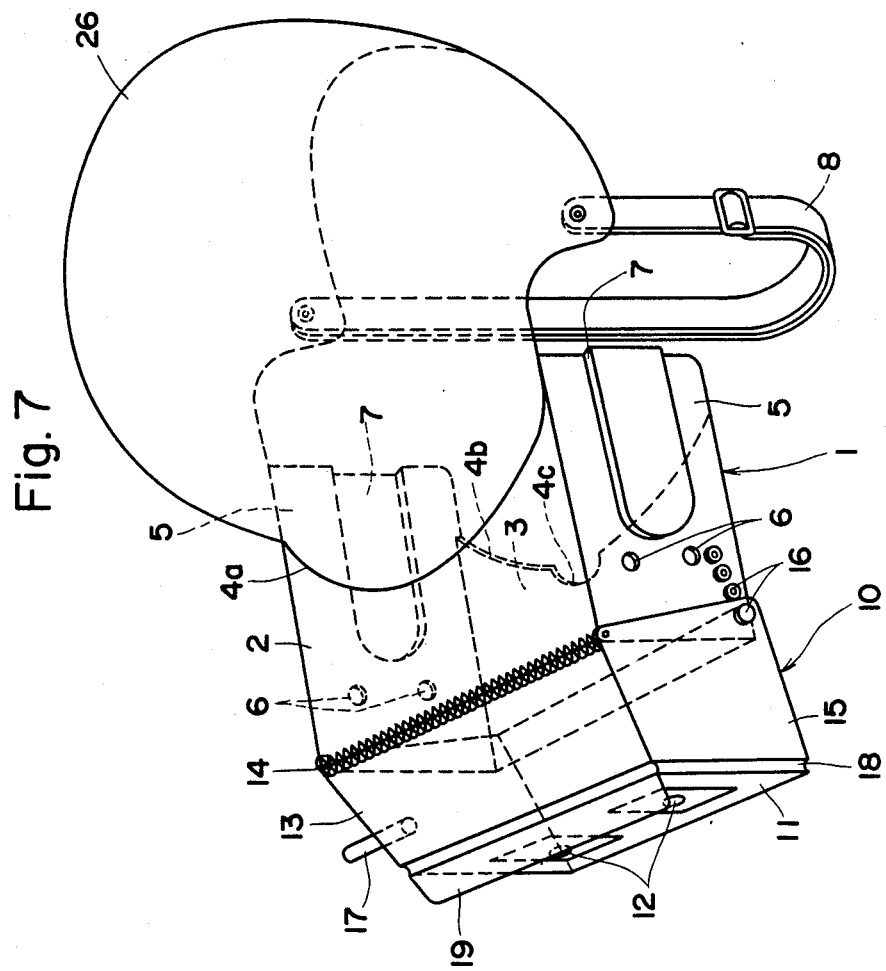
FIGS. 7 and 8 illustrate a second embodiment of the golf practicing device of the invention, in which there is provided a cap-form element secured to the body of same construction as that of the first embodiment.
Figure 8:
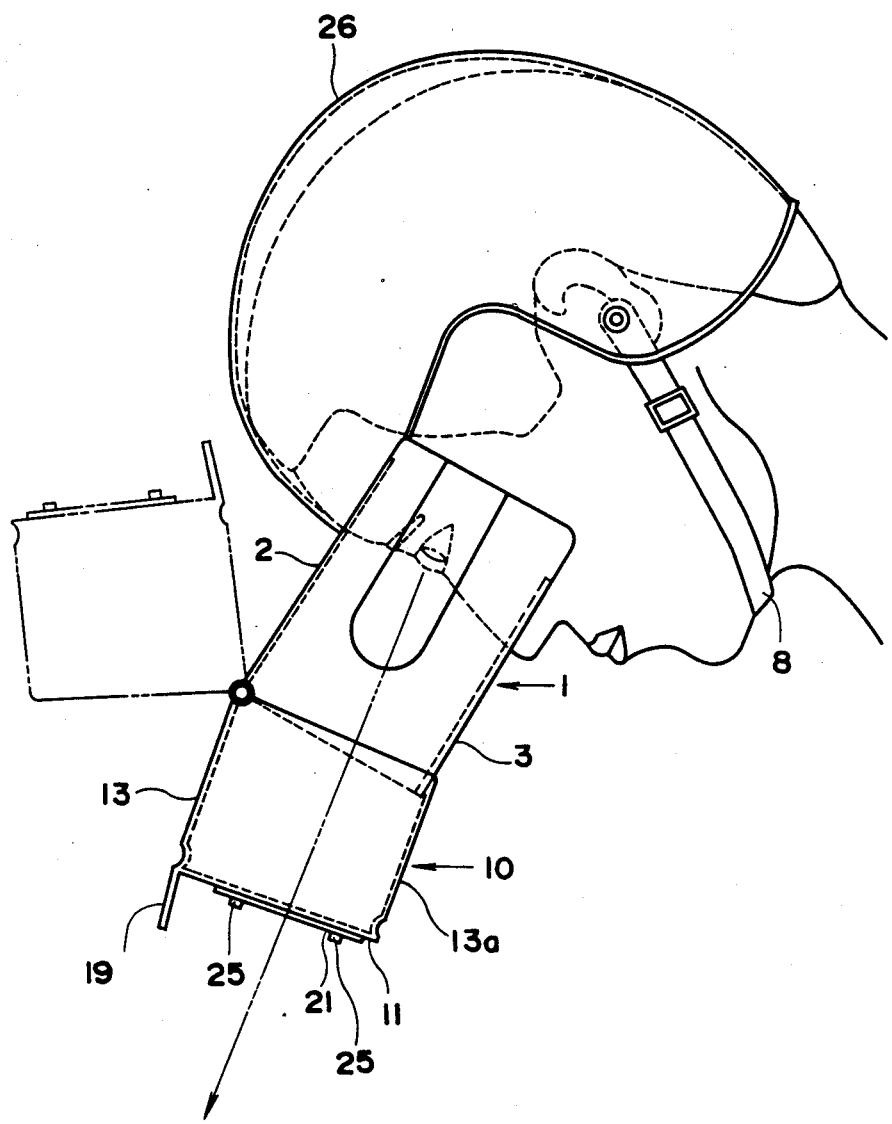

FIGS. 7 and 8 show a second embodiment of the invention. This embodiment is different from the first embodiment in that a helmet shaped cap member 26 is attached to a rear end portion of the top plate 2 of the body 1 and that the holder band 8 is secured to respective lower end portions of right and left side walls of the cap member 26 and not to the body 1. The body 1 and the field of vision constricting element 10 are of same construction as those in the first embodiment. The cap member 26 may be manufactured separately from the body 1 and fixed to the rear end portion of the body 1 by adhesive bonding, welding, or otherwise; or the body 1 and the cap member 26 may be integrally molded of synthetic resin. For the cap member 26, known types of cap, helmet, or the like may be used, but from the standpoint of ease of mounting of the body 1, one without front collar, or one with a short collar, if any, is preferred. For the synthetic resin which can be used for the above mentioned purpose, ABS resins, NS resins, formaldehyde resins, polycarbonate resins, etc. may be mentioned by way of example. From the standpoints of strength, shape retention, cost economy, etc., however, thermoplastic engineering plastics are preferred.

The second embodiment has an advantage over the first embodiment in that since the cap member 26 is put on the head, the device can be more securely held in position. In the second embodiment, therefore, the device need not be provided with the holder band 8, but it may be noted that the provision of the holder band 8 offers the advantage that the device is prevented from slipping out of place due to shock when the ball is hit.

Figure 9:
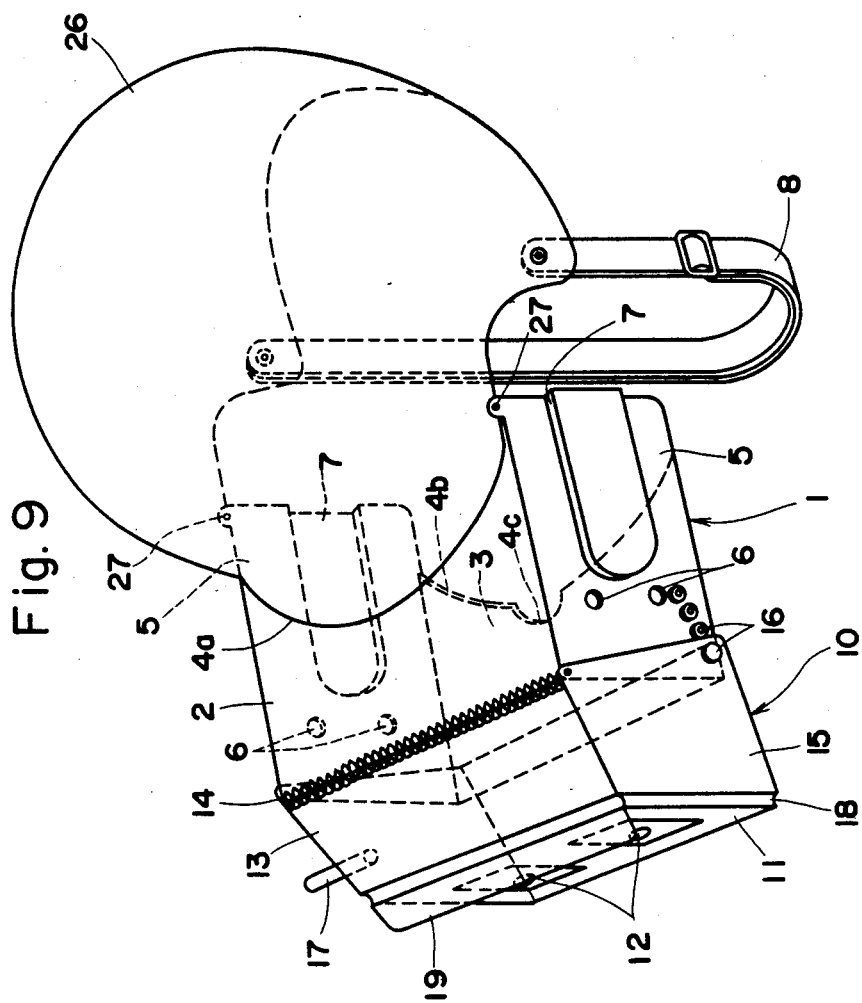
FIGS. 9 and 10 illustrate a third embodiment in which a cap-form element is pivotably secured to the body of same construction as that of the first embodiment.
Figure 10:
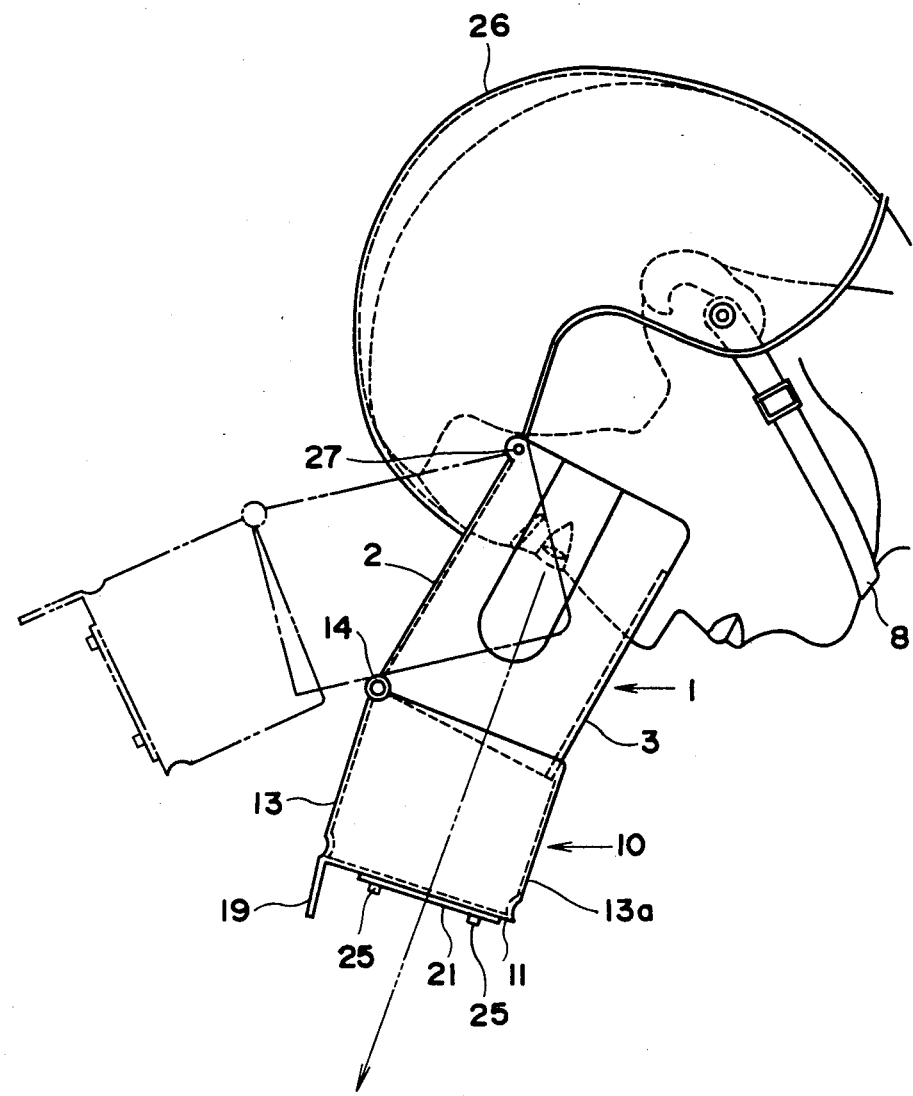

FIGS. 9 and 10 show a third embodiment in which the cap member 26 of the second embodiment is pivotably attached to the body 1. In this embodiment, the top rear edges of the side plates 5 of the body 1 are pivotably fixed by a pin 27 to the corresponding side walls of the cap member 26 at their front ends. Therefore, when putting the device on the head, the body 1 can be snapped upward. So, the device is easy to put on and off. A screw pin may be used in place of the pin 27. This provides an advantage that the body 1, after pivotally moved, can be tightened and suitably fixed in position.

Figure 11:
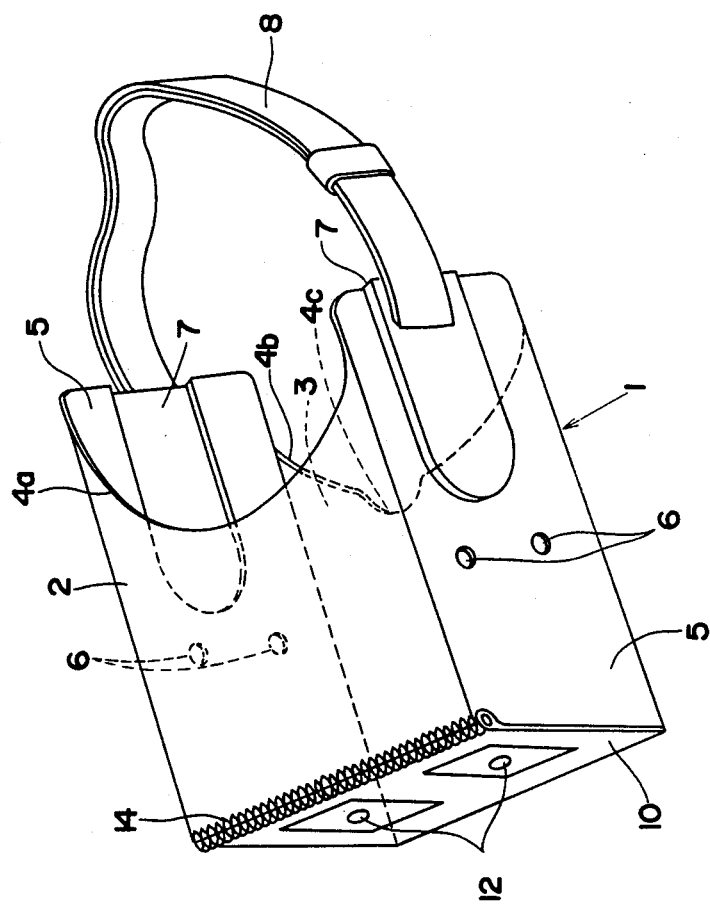
FIGS. 11 and 12 illustrate a fourth embodiment in which the body of the device is of rectangular tube form, with a plate-shaped field of vision constricting element pivotably mounted to the body at the front end thereof.
Figure 12:
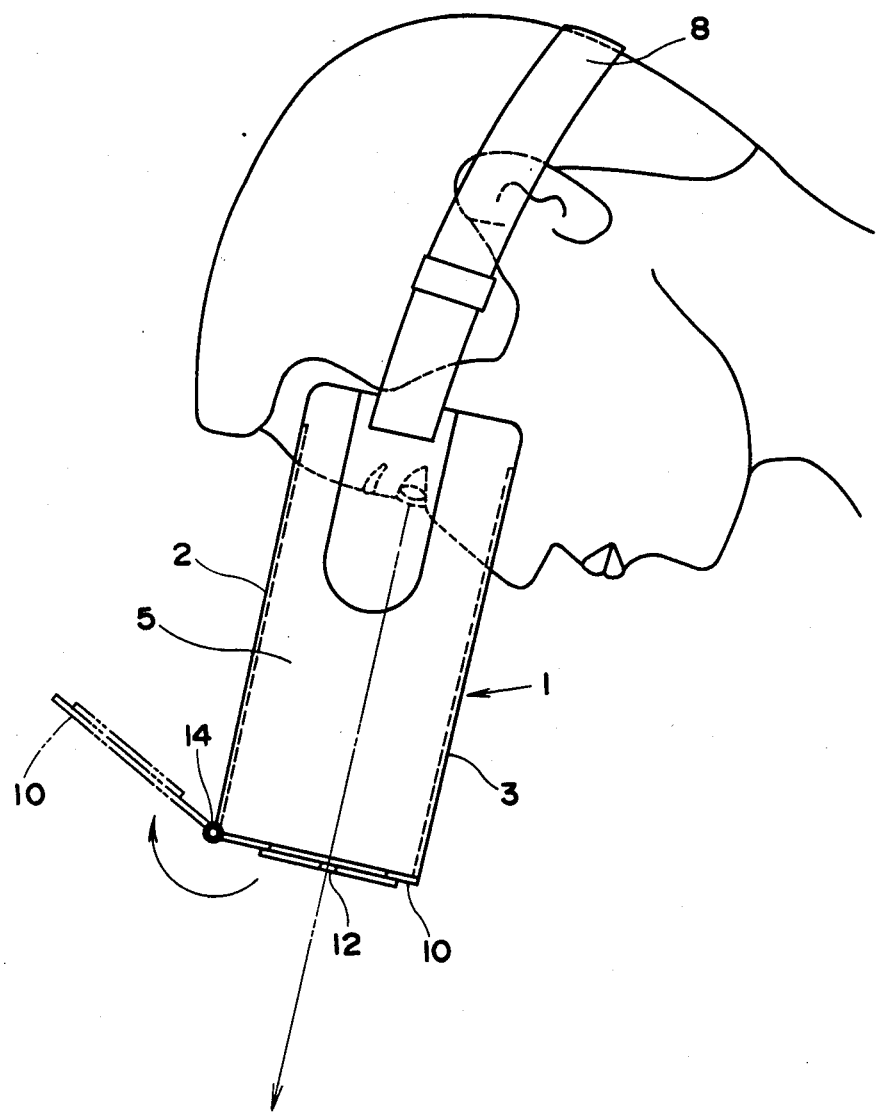

FIGS. 11 and 12 illustrate a fourth embodiment, in which the field of vision constricting element 10 is in the form of a simple rectangular plate. As in the above described embodiments, the field of vision constricting element 10 is pivotably fixed to the front end portion of the top plate 2 of the body 1. Contrary to those in the foregoing embodiments, however, this vision constricting element 10 is urged downward by the spring 14 in such a way that it is pressed against the body 1, because in this embodiment there is no tilt angle adjuster 16 and there is no way of holding the vision constricting element 10 but pressing it by the spring 14 against the body 1. Therefore, the vision constricting element 10 is constantly in abutment with the front edge portion of the body 1 unless it is pushed upward by finger. Thus, the means for holding and securing the vision constricting element 10 can be eliminated, and front vision can be had by snapping the element 10 upward. The body 1 is generally of same construction as in the first to third embodiments. Since the field of vision constricting element 10 is in a simple rectangular plate form and no holding and fixing means is present, this embodiment is advantageous in that the device is simple in construction and inexpensive to manufacture.

In FIGS. 13 to 16, there is shown a fifth embodiment in which the body 1 and the field of vision constricting element 10 are of different configuration from those in the first to fourth embodiments. In this embodiment, the body 1 and the vision constricting element 10 are both flat shaped. The device as a whole is of a compact construction which is similar to the so-called "sun visor" often used in golfing. In this embodiment, the body 1 has a flat top plate 2 and side plates 5 extending downward at both sides, right and left, of the top plate 2, and no other plate. Therefore, the body 1 is open not only at the front and rear sides, but also at bottom side. In order to ensure the safety of the device when worn, the body 1 is provided at the rear end thereof an abutment member 28 which abuts the forehead and the cheek of the wearer. This abutment member 28 may be molded of synthetic resin integrally with the body 1, or it may be separately molded and secured to the body 1 by adhesive bonding or otherwise. The abutment member 28 has a rearwardly curved plate-like configuration, and its upper edge 28a is configured in same pattern as the inwardly curved rear edge portion 4a of the top plate 2 in the foregoing embodiments, its lower edge 28b being of same configuration as the curved edge portion 4b having an arcuate notch 4b in a center portion thereof. As can be seen from FIG. 14, the device can be securely mounted on the head of the wearer by means of the holder band 8 in same manner as in the first to fourth embodiments, with the upper edge 28a brought in abutment with the forehead and the lower edge 28b in abutment with the cheek. The holder band 8 is fixed in position by passing it through elongate holes 29 provided at right and left ends of the abutment member 28, instead of being fixed to the body 1.

Figure 13:
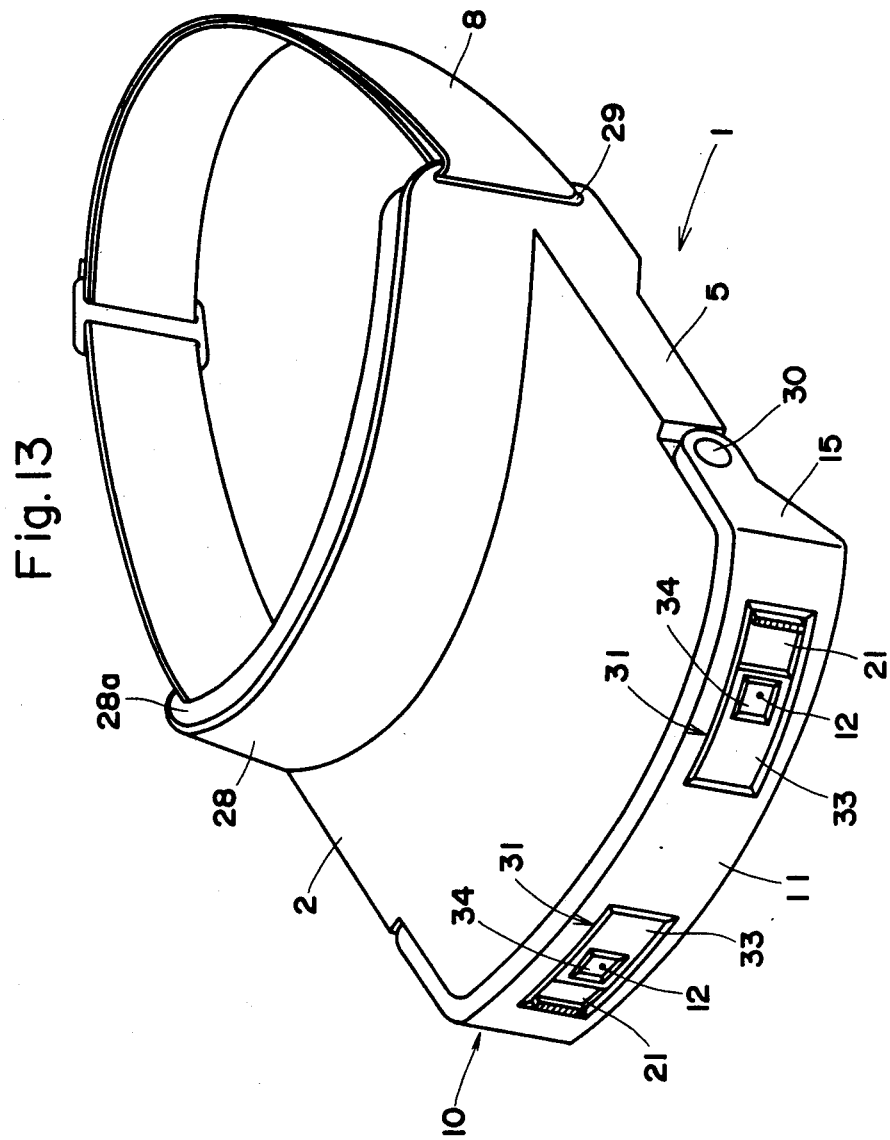
FIGS. 13 to 16 illustrate a fifth embodiment in which the body of the device and the field of vision constricting element are of flat configuration.
Figure 14:
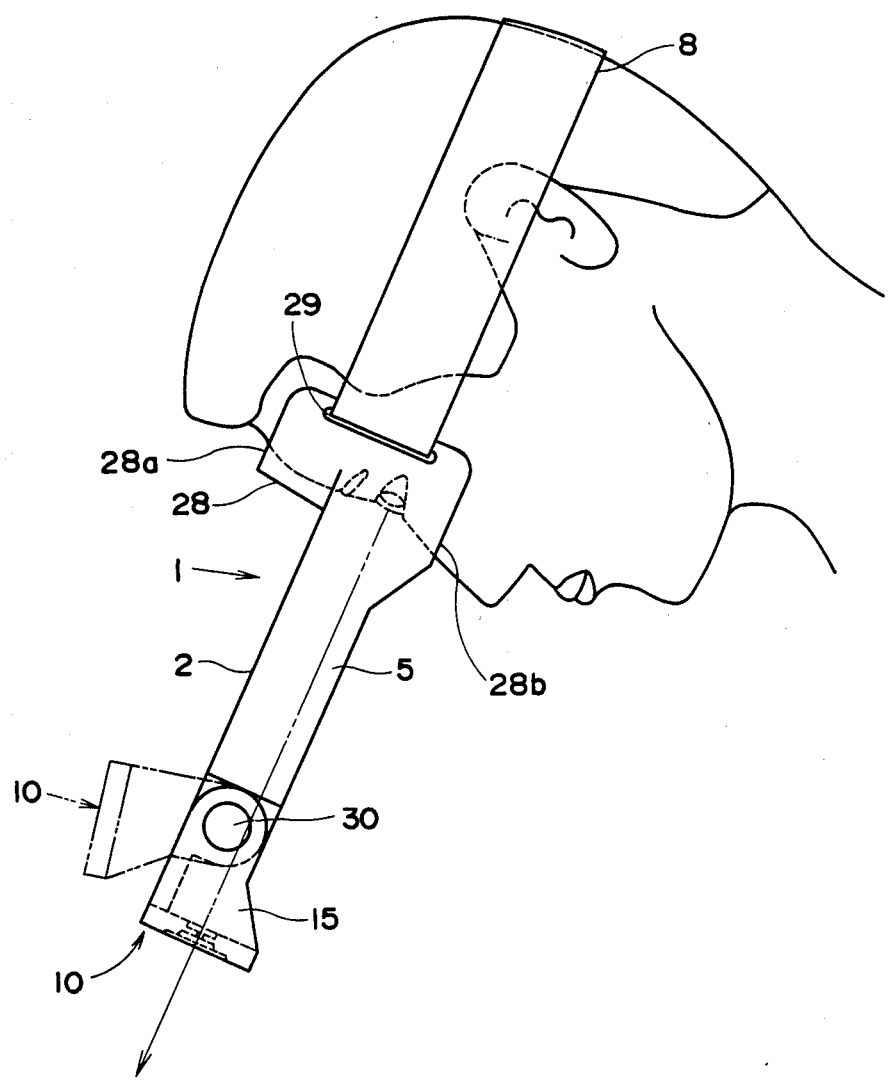

The field of vision constricting element 10 is of such configuration that a narrow elongate plate is bend at both ends, and it pivotally fixed at said both ends by a pin 30 to the front end portion of the body 1. In FIG. 13, the upper inner side of the vision constricting element 10 is in abutment with the front edge of the top plate 2 and, therefore, the element 10 cannot be moved further downward, it being held in the condition shown. However, if pushed upward by finger, the vision constricting element 10 is pivoted about the pin 30 so that it can be moved to the position shown by a two-dot chain line in FIG. 14.

Figure 15:
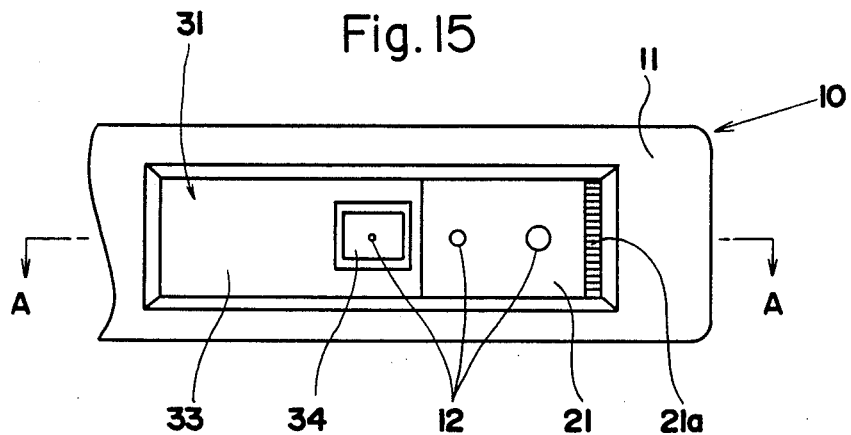
Figure 16:
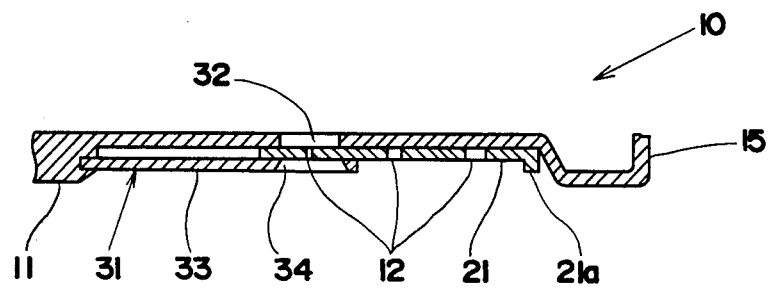
Figure 17:
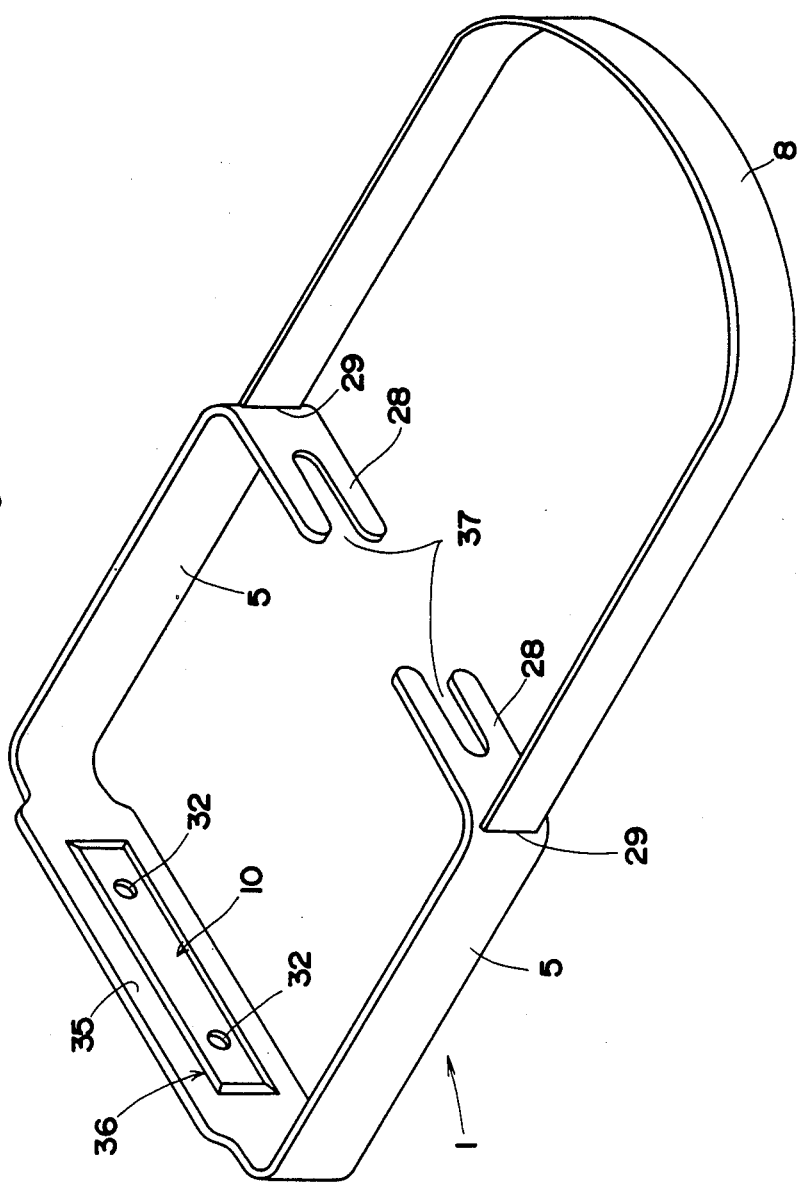
FIGS. 17 to 20 are views showing other embodiments of compact and simple construction.

In the case of the present embodiment, the diameter and position adjustment of the two vision constricted view apertures 12 is carried out in a different way from that in the foregoing embodiments. As shown in FIGS. 15 and 16, the front plate 11 is formed with two rectangular recesses 31 so that rectangular shift plates 21 can be individually moved along the length of the front plate 11 by being fitted in the recesses 31. In the shift plate 21 there are provided a plurality of vision constricted view apertures 12 (three in number in this embodiment) in parallel relation, while in the bottom of each of the recesses 31 there is provided a hole 32 of a larger diameter than each of the vision constricted view aperture 12. Therefore, by placing in this hole 32 one selected from the plurality of view apertures 12 in superposed relation it is possible to adjust the diameter of the view aperture 12. The shift plate 21 is pressed and held in position by a retainer plate 33 mounted to the front plate 11 from the front side. The retainer plate 33 extends to a level above the hole 32 in said recess 31, but it has a rectangular hole 34 at a position at which it is in superposed relation with the hole 32; therefore, such superposition involves no problem.

The distance between the two vision constricted view apertures 12 and their positions can be adjusted by allowing the shift plate 21 to slide in the longitudinal direction of the recess 31. In order to provide a wider adjustable range, it is preferable that the holes 32, 34 are formed in a comparatively large size. A knob 21a is provided at one end of the shift plate 31 in order to facilitate the control of the shift plate 31.

The fifth embodiment of the above described arrangement permits visual recognition of conditions adjacent the feet when the device is worn, because it is open at the bottom side, and this assures safety without involving any possible danger due to the device being worn. Further, it provides an advantage that the device is compact and non-bulky, as in the foregoing embodiments, it is possible to snap the vision constricting element 10 upward in order to confirm the direction of flight of the ball. In this embodiment, needles to say, same adjuster means for the vision constricted view apertures 12 as used in the first to fourth embodiments can be employed.

In FIGS. 17 through 20 there are shown other embodiments which are of more simple and compact arrangement and inexpensive to manufacture. In all these embodiments, the body 1 is of such simple construction that a narrow and elongate plate material is bent into a generally rectangular shape. In a sixth embodiment shown in FIG. 17, adjuster means for aperture diameter and position adjustment of a pair of field of vision constricted view apertures 12, which are of same construction as the fifth embodiment shown in FIGS. 13 through 16, are provided on one flat plate and same is fitted in a rectangular cut-out portion 36 provided in a front plate 35 which connects two side plates 5, whereby the adjuster means are directly mounted to the body 1. Therefore, as in the fifth embodiment, the wearer can have an outside view through the holes 32 in the bottom of the recesses 31, the vision constricted view apertures 12, and the rectangular holes 34 in the retainer plate 33. Further, by moving the shift plate 21 it is possible to adjust the diameter and position of each vision constricted aperture hole 12. Needless to say, in this embodiment, too, it is possible to employ same adjuster means as employed in the first embodiment.

Figure 20:
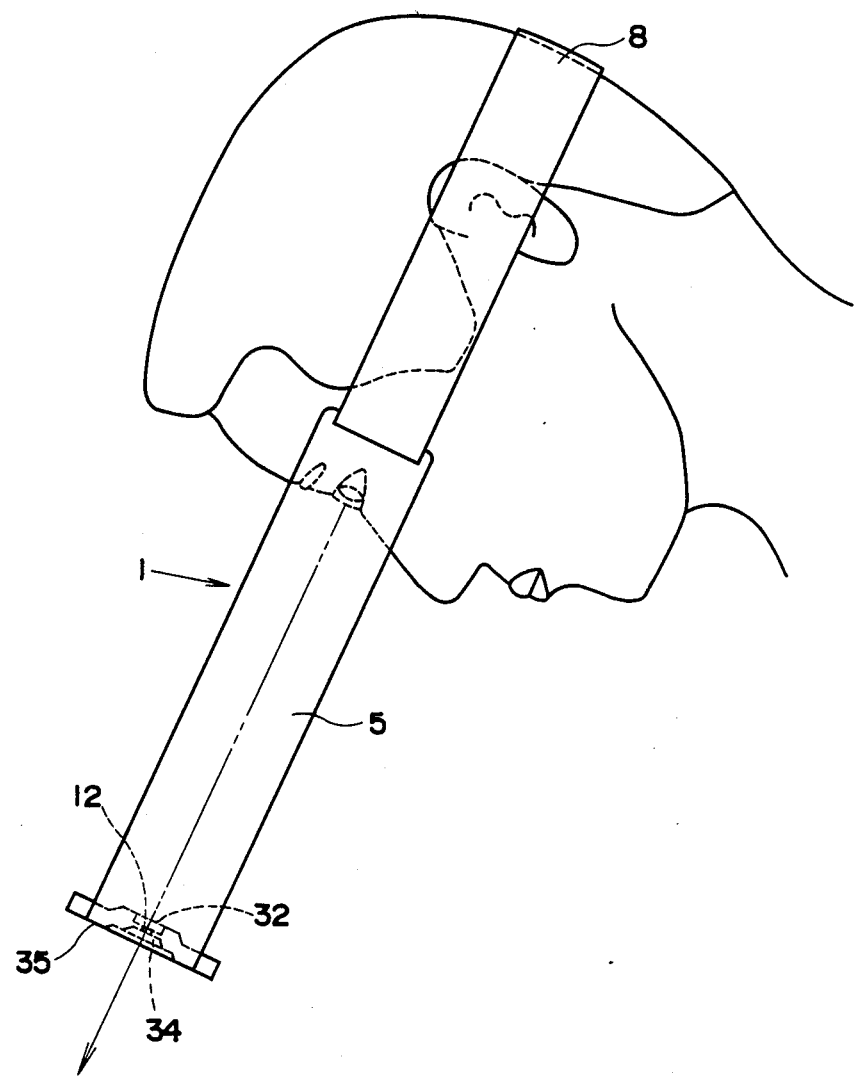

The body 1 is provided at the rear side thereof with a pair of abutment members 28 in continuation from the side plates 5, a holder band 8 being secured to elongate holes 29 formed at outer ends of the abutment members. The abutment members 28, as can be seen from FIG. 20, are brought in abutment with face portions around the eyes, laid-down U-shaped cutouts 37 being formed at the inner end portions of each of the abutment members 28 so that the wearer can see a front view through the cutouts 37.

Figure 18:
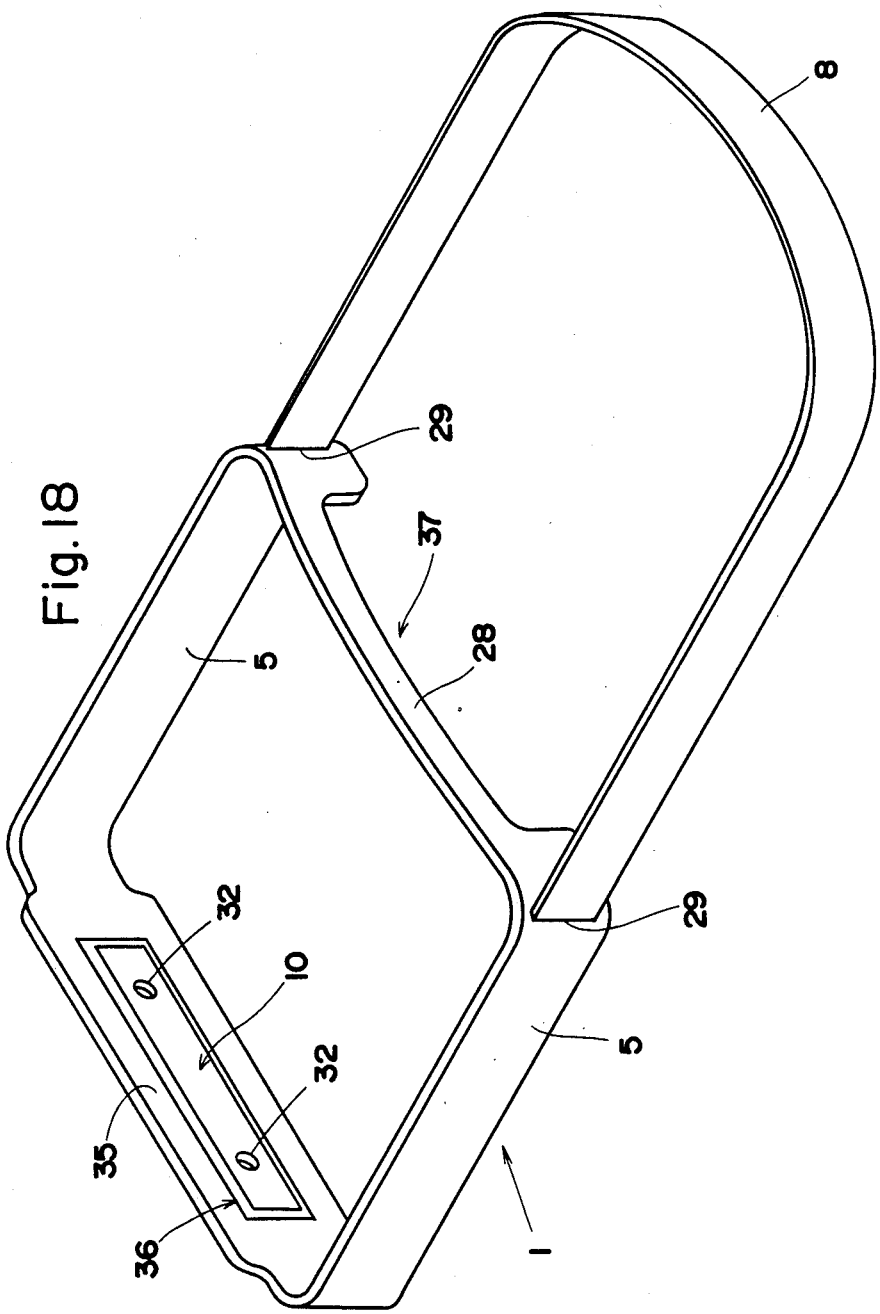
Figure 19:
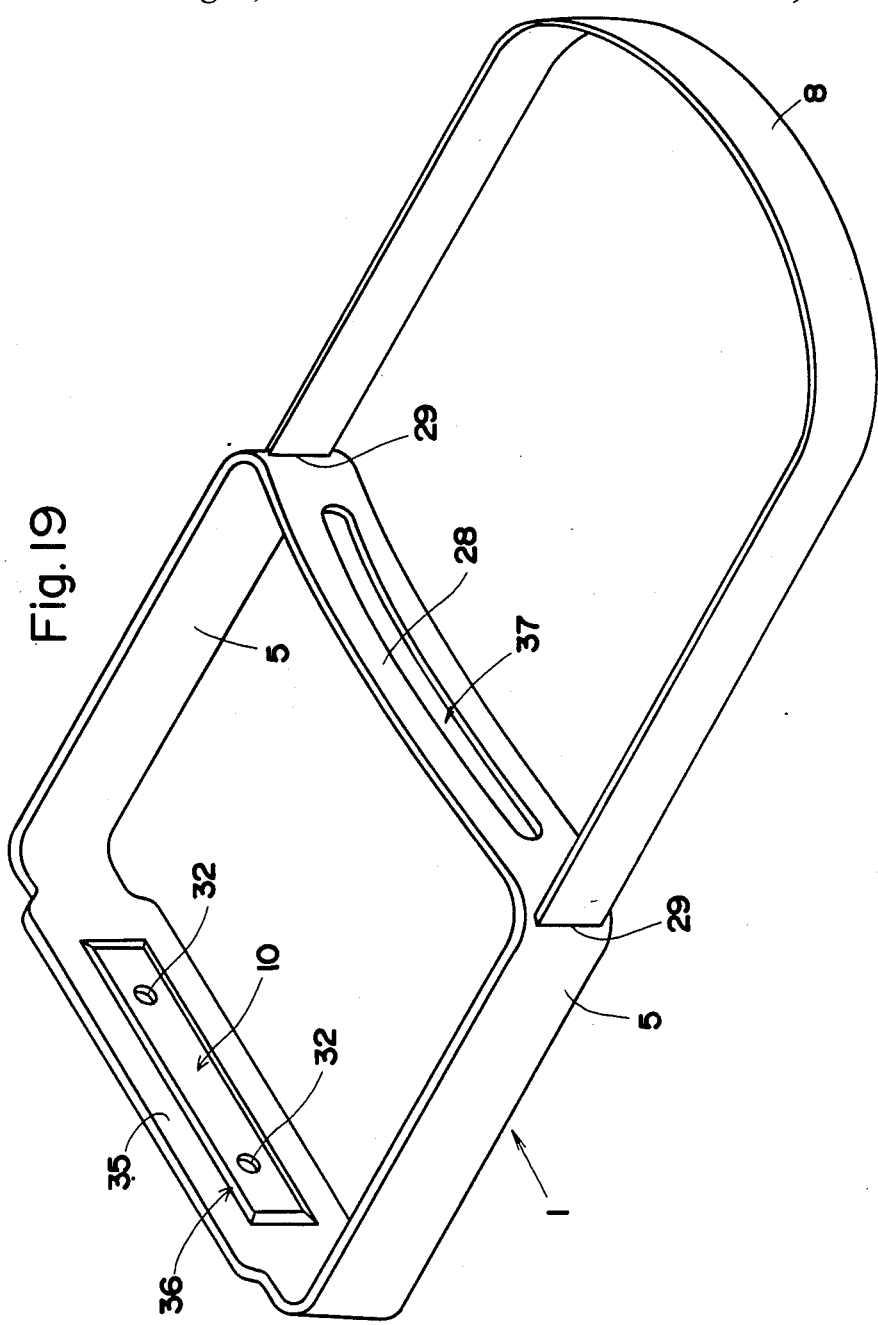

A seventh embodiment in FIG. 18 and an eighth embodiment in FIG. 19 are of same construction as the sixth embodiment except that the abutment members 28 are different in configuration. In the seventh embodiment, the abutment member 28 is one single member which connects the side plates 5, an inverted U-shaped cutout portion 37 being formed in the lower portion of the abutment member 28. The eighth embodiment is such that while the abutment member 28 is a single member which connect the side plates 5 as in the seventh embodiment, the cutout portion 37 is centrally formed which is of a laid-down O shape.

The sixth to the eighth embodiments are all not only very compact, but also very simple in construction, and therefore they are easy and inexpensive to manufacture. Furthermore, the body 1 is open at top and bottom sides, which fact affords ease of safety confirmation of surrounding conditions when in hitting practice.

It is to be understood that the above illustrated embodiments of the invention are exemplary of preferred embodiments and that various modifications as to the configuration, size, etc. of individual parts can be done without departure from the spirit of the invention and the appended claims.

What is claimed is:

1. A device for golf practicing for use by a golfer by mounting it on his head when the golfer trains himself in hitting a golf ball with a golf club, comprising:

a body which is open at its front and rear sides and adapted to be held in position by bringing its rear open portion in abutment with the face of a wearer at a location around the eyes, a field of vision constricting element having at least two field-of-vision constricted view apertures and provided at the front open side of said body, holding means secured to said body for holding said device in position on the head, position adjuster means for adjusting the position of said field-of-vision constricted view apertures, and aperture diameter adjuster means for diametrical adjustment of said field-of-view constricted view apertures, whereby the golfer can hit the golf ball while looking at the ball through said field-of-view constricted view apertures via the interior of said body.

2. A device for golf practicing as set forth in claim 1 wherein said body is tube-shaped and said field of vision constricting element has a box-shaped configuration with the field-of-vision constricted view apertures disposed at the front side and which is open at the rear side, said field of vision constricting element being pivotally mounted at said front open side of said body so that when said vision constricting element is pivotally moved, the golfer can have a front sight through the interior of said body.

3. A device for golf practicing as set forth in claim 2 wherein said device has a tilt angle adjuster capable of adjusting and fixing the tilt angle of said field of vision constricting element relative to said body.

4. A device for golf practicing as set forth in claim 3 wherein said tilt angle adjuster consists of a combination of an eye provided either one of said body and said field of vision constricting element and a hook provided on the other thereof.

5. A device for golf practicing as set forth in claim 3 wherein said field of vision constricting element is upwardly urged by a spring.

6. A device for golf practicing as set forth in claim 1 wherein said position adjuster means for the field-of-vision constricted view apertures comprise a shift plate having a field-of-vision constricted view aperture formed therein, said shift plate being movably superposed on said field of vision constricting element, said field-of-vision constricted view aperture being brought in agreement with a hole having a larger size than the field-of-vision constricted view aperture, whereby said shift plate is movable within a range of movement in which said field-of-vision constricted view aperture is not disengaged from said large size hole.

7. A device for golf practicing as set forth in claim 5 wherein said shift plate is supported by elongate holes formed therein being disposed in intersecting relation with elongate holes formed in said field of vision constricting element, a locking member being fitted in each of said intersecting portions.

8. A device for golf practicing as set forth in claim 1 or 6 wherein as said aperture diameter adjuster means there are provided aperture stops of same arrangement as those used in cameras which are capable of adjusting the diameter of said field-of-vision constricted view apertures each provided centrally in said aperture stops.

9. A device for golf practicing as set forth in claim 1 wherein said holder means is in the form of a helmet shaped cap member.

10. A device for golf practicing as set forth in claim 9 wherein said cap member is pivotablly secured to said body.

11. A device for golf practicing as set forth in claim 1 wherein said body is tube shaped and said field of vision constricting element is flat plate shaped, said field of vision constricting element being pivotally mounted to said front side open portion of said body so that when said vision constricting element is pivotally moved, the golfer can have a front sight through the interior of said body.

12. A device for golf practicing as set forth in claim 11 wherein said field of vision constricting element is fixed in position by being urged by a spring in such manner as to be pressed against said body.

13. A device for golf practicing as set forth in claim 1 wherein said body comprises a flat element having a top plate and two side plates extending downward from the sides of the top plate, said field of vision constricting element being mounted to the front end of said body, an abutment member being provided at the rear end side of said body.

14. A device for golf practicing as set forth in claim 13 wherein as said field of vision constricting element there is provided a narrow and elongate plate member bent at both ends and having said field-of-vision constricted view apertures centrally provided therein, said plate member being pivotally mounted to the front end portion of said body.

15. A device for golf practicing as set forth in claim 13 wherein said aperture diameter adjuster means for said field-of-vision constricted view apertures comprise a shift plate having a plurality of field-of-vision constricted view apertures of different diameters and movably mounted on said field of vision constricting element, and hole provided in said field of vision constricting element and having a size larger than the diameters of said plurality of field-of-vision constricted view apertures, so that one view aperture selected from said plurality of field-of-vision constricted view apertures is brought in agreement with said larger size hole, the aperture diameter being thereby adjusted.

16. A device for golf practicing as set forth in claim 13 wherein said position adjuster means for said field-of-vision constricted view apertures comprise a hole having a larger size than those of the field-of-vision constricted view apertures provided in said field of vision constricting element, and a shift plate having at least one field-of-vision constricted view aperture, whereby said at least one field-of-vision constricted view aperture is movable within a range in which it is allowed to go in superposed relation with said large size hole.

17. A device for golf practicing as set forth in claim 1 wherein said body comprises a narrow and elongate plate member bent into a generally rectangular shape, said field of vision constricting element being mounted to the front end portion of said plate member, an abutment member being mounted to the rear end portion thereof.

18. A device for golf practicing as set forth in claim 17 wherein said aperture diameter adjuster means for said field-of-view constricted view apertures comprise a shift plate having a plurality of field-of-vision constricted view apertures of different diameters and movably mounted to said field of vision constricting element, and a hole provided in said field of vision constricting element and having a larger size than the diameters of said plurality of field-of-vision constricted view holes, whereby one view aperture selected from said plurality of field-of-vision constricted view apertures is brought in agreement with said large size hole, the aperture diameter being thereby adjusted.

19. A device for golf practicing as set forth in claim 17 wherein said position adjuster means for said field-of-vision constricted view apertures comprise a hole provided in said field of vision constricting element and having a larger size than the field-of-vision constricted view apertures, and a shift plate having at least one field-of-view constricted view apertures the at least one field-of-vision constricted view aperture is movable within a range in which it can go into superposed relation with said large size hole.

20. A device for golf practicing as set forth in claim 17 wherein said field of vision constricting element is fixed to said body and is unmovable.

21. A device for golf practicing as set forth in claim 17 wherein said abutment member having a cutout portion through which the wearer can see the golf ball.

22. A device for golf practicing as set forth in claim 21 wherein there are provided two said abutment members, each of the abutment members being connected to one or the other of said side plates, said each abutment member having said cutout portion.

23. A device for golf practicing as set forth in claim 21 wherein said abutment member is one member which connects both side plates of said body.

* * * * *